S. G. NEAL.
AIR BRAKE APPARATUS.
APPLICATION FILED NOV. 17, 1916.

1,314,973.

Patented Sept. 2, 1919.
4 SHEETS—SHEET 1.

Inventor
Spencer G. Neal,
By his Attorneys,
Davis & Davis

UNITED STATES PATENT OFFICE.

SPENCER G. NEAL, OF NEW YORK, N. Y., ASSIGNOR, BY MESNE ASSIGNMENTS, TO AUTOMATIC STRAIGHT AIR BRAKE COMPANY, OF WILMINGTON, DELAWARE, A CORPORATION OF DELAWARE.

AIR-BRAKE APPARATUS.

1,314,973.  Specification of Letters Patent.  Patented Sept. 2, 1919.

Application filed November 17, 1916. Serial No. 131,818.

*To all whom it may concern:*

Be it known that I, SPENCER G. NEAL, a citizen of the United States, and residing in the borough of Manhattan, city, county, and State of New York, have invented certain new and useful Improvements in Air-Brake Apparatus, of which the following is a specification.

This invention relates more particularly to improvements in that type of triple valve illustrated in my application for patent filed February 25, 1916, and serially numbered 80,342.

One of the important objects of this invention is to provide simplified means whereby upon a sudden reduction of train pipe pressure sufficient to secure an emergency application of the brakes the train pipe will be vented to atmosphere through each triple valve. By providing means whereby each triple valve will vent the train pipe to atmosphere the reduction will be secured throughout the train pipe with great rapidity, causing the operation of all the triple valves and the application of all the brakes, almost simultaneously, without regard to the length of the train.

Another important object of the invention is to provide means whereby upon an emergency application of the brakes, air from the supplemental or train pipe reservoir will be delivered into the emergency brake cylinder chamber and will operate to open communication between the emergency reservoir and the brake cylinder for an emergency application of the brakes.

A further object of the invention is to provide means whereby the train pipe reservoir will be connected to the train pipe upon a service application of the brakes, whereby said train pipe reservoir volume will be disconnected from the train pipe in emergency applications of the brakes, and will be added to the emergency reservoir volume, said train pipe reservoir air also operating means to place the emergency reservoir in communication with the brake cylinder.

Referring to the various parts by reference characters, A designates the service section of the triple valve; B the emergency section of the triple; C an emergency reservoir; D the brake cylinder; E the change-over or retaining valve, and F the train pipe reservoir.

Figure 1:
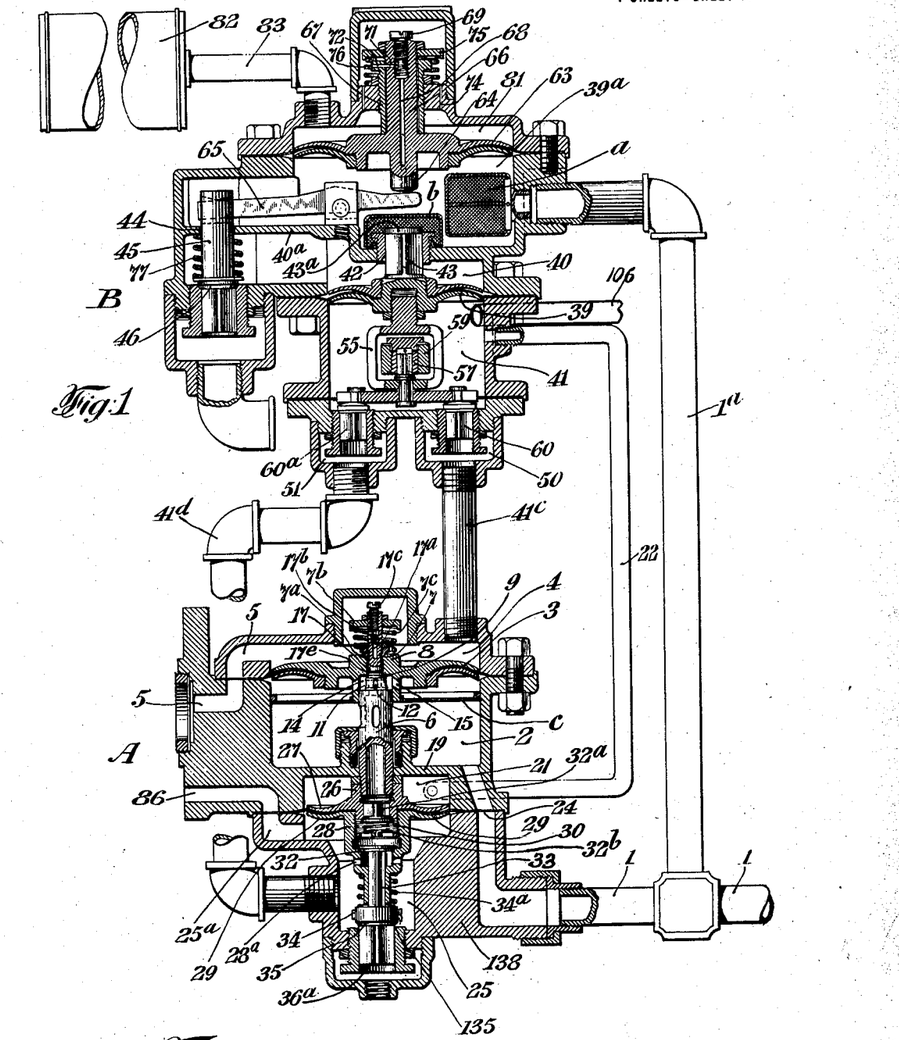
Figure 1 is a vertical sectional view of the improved triple valve.

As illustrated in Fig. 1 of the drawings, section A of the triple contains the parts by which the service applications of the brakes are secured and through which the release of the brakes is obtained, and also through which the apparatus is charged. Section B contains the parts which control the emergency applications of the brakes. It will, of course, be understood, however, that the new features of construction described herein are applicable to the triple valve when formed in a single or unitary structure as shown in my Patent No. 1,082,758, dated December 30, 1913, and that I am not to be restricted to the use of the means herein described with a two-part or two-section triple valve.

Section A of the triple valve is constructed, with a few changes and modifications, almost precisely as shown in my application Serial No. 80,342, filed February 25, 1916, and operates precisely as described in said application. For this reason it is thought unnecessary to minutely and particularly describe herein every part of section A of the triple valve, and its operation. Section B of the triple is modified considerably, and this part of the triple will be fully described, both as to structure and operation.

The train pipe 1 leads into the main train pipe chamber 2, said chamber being in section A of the valve. Above said chamber 2 and separated therefrom by the main abutment or diaphragm 3, is an emergency reservoir chamber 4 in constant communication with the emergency reservoir through passage 5. In order that said abutment 3 may operate valves hereinafter described, the same is made to coöperate with a hollow upright valve stem 6 provided with a reduced upper end. The main diaphragm 3 carries a sliding head 8 which has a working fit around the stem 6 and is provided with a downwardly facing valve seat 9, which cooperates with the charging valve 11, this latter valve being a part of upright rod or stem 6. Said valve stem 6 forms a guide for the sliding head 8, so that the air pressure upon the diaphragm 3 may be utilized to positively open and close said valve 11.

Figures 3, 4:
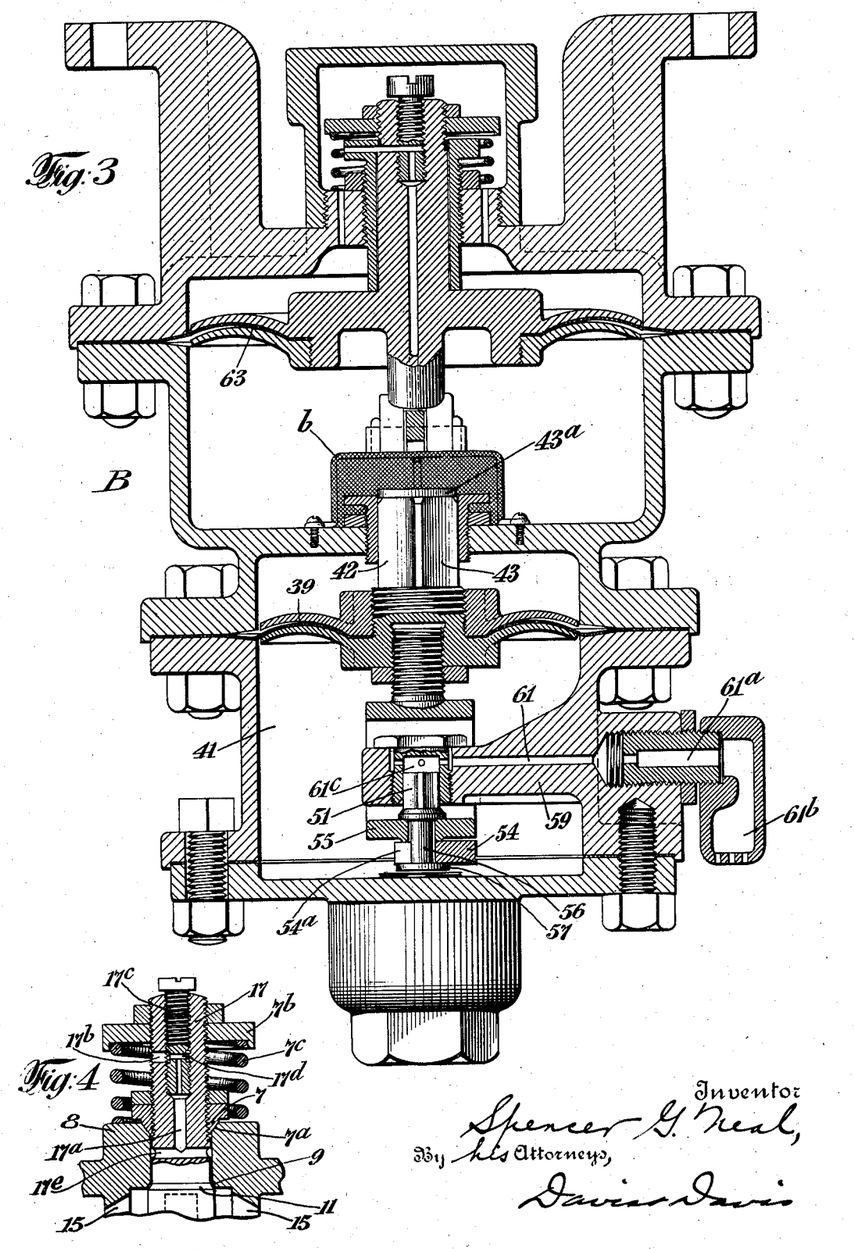
Fig. 3 a vertical sectional view taken on the line III—III of Fig. 2.
Fig. 4 a detail view of a portion of the means for charging the emergency reservoir.
Figure 5:
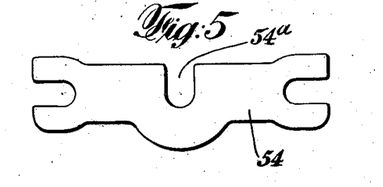
Fig. 5 a detail view of the yoke bar which connects together the valves controlling communication between the emergency reservoir and the brake cylinder.

Referring more in detail to the construction and operation of the valve device within the head 8, the hollow rod 6 is open at its lower end, but the bore in said rod terminates at a point a little below the valve 11, as indicated by dotted lines in Figs. 1 and 4. Air is admitted through inlets 12 into the upper portion of the bore of said rod 6. Said inlets 12 communicate with a clearance 14 around said valve 11. A plurality of ports 15 lead through the wall of the head 8 to admit air to said clearance 14, thence to the inlets 12 which communicate with the interior of the hollow rod 6. The upper portion of hollow rod 6 is provided with a somewhat reduced portion which forms the valve 11 already referred to. Above said valve 11 the stem is provided with a more reduced portion 17, the clearance around which will conduct the air to chamber 4 from around the hollow rod 6 when the valve 11 is opened.

Secured to the reduced portion 17 of the stem 6 above the abutment 3, is a downwardly tapered valve 7 which is adapted to fit a corresponding seat 7$^a$ in the top of the head 8 of the abutment 3. The valve 7 is so placed on the stem 17 that when valve 11 is seated valve 7 will be a considerable distance above seat 7$^a$. Valve 7 is locked in its adjusted position by a suitable lock nut, as shown in Figs. 1 and 4. On the upper end of the stem 17 is a disk 7$^b$, between which and the upper surface of the sliding head 8 is confined a coil spring 7$^c$. This spring exerts a force tending to bring valve 11 to its seat 9. The disk 7$^b$ is locked on the stem 17 by means of a suitable lock nut, and, of course, may be adjusted in order to cause the spring 7$^c$ to exert the desired pressure on the abutment 3. There is a considerable clearance between the sliding head 8 of the abutment or diaphragm 3, and the stem 17, so that when the head is between the valves 7 and 11 there will be an air passage of considerable capacity through the abutment.

The stem 17 is bored axially as at 17$^a$, from its upper end to the transverse port 17$^e$, a port 17$^b$ connecting the said bore with chamber 4. A governing screw 17$^c$ is threaded into the end of the bore 17$^a$, said screw being centrally apertured from its inner end to a transverse port 17$^d$, (see Fig. 4) this latter port communicating with the port 17$^b$. The screw 17$^c$ is provided with a reduced portion to form a small annular chamber adjacent to the port 17$^d$, said port 17$^d$ communicating with said annular chamber. The port 17$^e$ opens into an annular groove in part 17, between the valve seats 7$^a$ and 9.

Upon a reduction of train pipe pressure in chamber 2 for the purpose of securing a service application of the brakes, abutment 3 is moved downwardly by the superior pressure in chamber 4, and valve 11 is seated on the valve seat 9, thereby closing communication between the chambers 2 and 4. Upon an increase of pressure in train pipe chamber 2 for the purpose of securing a release of the brakes, the abutment 3 and the stem 6 will be moved upwardly, thereby closing valve 32 and opening exhaust valve 35. This upward movement of the abutment will continue until the lock nut on stem 6 abuts against the under side of the cross wall 19. Should the pressure in chamber 2 exceed the pressure in chamber 4 the abutment will be moved upwardly against the pressure of the spring 7$^c$ and seat valve 7, as indicated in Figs. 1 and 4, and air will slowly pass valve 11 through ports 17$^e$, 17$^a$, and screws 17$^c$ into chamber 4. When the pressure in chamber 4 has equalized with pressure in chamber 2, the spring 7$^c$ will move the abutment downwardly to bring valve 11 to seat 9. When the sliding head 8 of the abutment 3 is between the valves 7 and 11, air from chamber 2 may pass around said valves to chamber 4 if the pressure in chamber 2 exceeds pressure in chamber 4.

In originally charging the apparatus if the rise of train pipe pressure is rapid, air will pass from chamber 2 around valve 11, slowly through bore 17$^a$ and port 17$^b$ to chamber 4 and to emergency reservoir. If the rise of pressure in the train pipe and in chamber 2 is slow, air will pass rapidly and in considerable quantities around valve 11, through the clearance between the head 8 and the stem 17, around valve 7, into chamber 4, and at the same time air will pass through the bore 17$^a$ and port 17$^b$. This will provide a very quick charge of the chamber 4 and emergency reservoir.

It is only when there is a considerable excess pressure in chamber 2 that the valve 7 will be seated and the slow charge will take place through the ports in the stem 17 and screw 17$^c$.

Beneath the train pipe chamber 2 and separated therefrom by a cross wall 19 is a chamber 21. An equalizing abutment 24 extends across the lower side of the chamber 21 to separate said chamber from an equalizing chamber 25. Chamber 21 is connected to emergency brake cylinder chamber 41 (which will be hereinafter described), by a pipe 22, so that the pressure in the said two chambers will be the same at all times. In the embodiment of the invention illustrated in the drawings, the main abutment 3 has about twice the area of the equalizing abutment 24. Therefore, the reduction of train pipe pressure ten pounds will cause approximately twenty pounds pressure to be built up in the brake cylinder and in the equalizing chamber 25 before there will be enough pressure beneath said equalizing abutment to lift the rod 6 and close valve 32, all of which is clearly set out in my aforesaid patent. Hollow rod 6 at its lower end screws into a hub 26 formed on the upper side of flange 27 of the equalizing abutment 24. A nut locks the hub to the stem and said nut is adapted to engage the under side of the cross wall 19 to limit the upward movement of the rod. The flange 27 is formed with a central depending hollow stem which screws into the upper end of a valve cage 28, said valve cage carrying the lower abutment flange 29 for the abutment 24. The said valve cage and rod afford communication between the equalizing chamber 25 and the train pipe chamber 2. The valve cage 28 forms a small chamber 30, the outlet of which is controlled by the valve 32 seating downwardly and having a downwardly extending stem 33 carrying at its lower end an exhaust valve 35 which opens and closes a vent 36ª. The lower end of the stem 33 is loosely connected to the valve 35 by pin 34, whereby said valve will be free to seat squarely and truly on the valve seat 135. The valve cage 28 is also provided with passages 28ª below valve 32. Equalizing chamber 25 is formed by casing 138 upon the lower end of which is screwed a protecting cap. Chamber 25 is in direct communication with the brake cylinder through port 25ª and passage 86.

A valve 32ª is held to its seat by means of a spring 32ᵇ, the lower end of said spring being seated in a spider arm within the chamber 30, said arm being spaced sufficiently far above the valve 32 to permit it to have a free opening movement. Valve 32ª prevents air passing back to the train pipe chamber 2 during an emergency application of the brakes when the brake cylinder pressure exceeds train pipe pressure, all of which is fully set out in my aforesaid application for patent. Valve 35 is held yieldingly to its seat by spring 34ª which is placed between the lower end of the valve cage 28 and the upper surface of valve 35.

Figure 2:
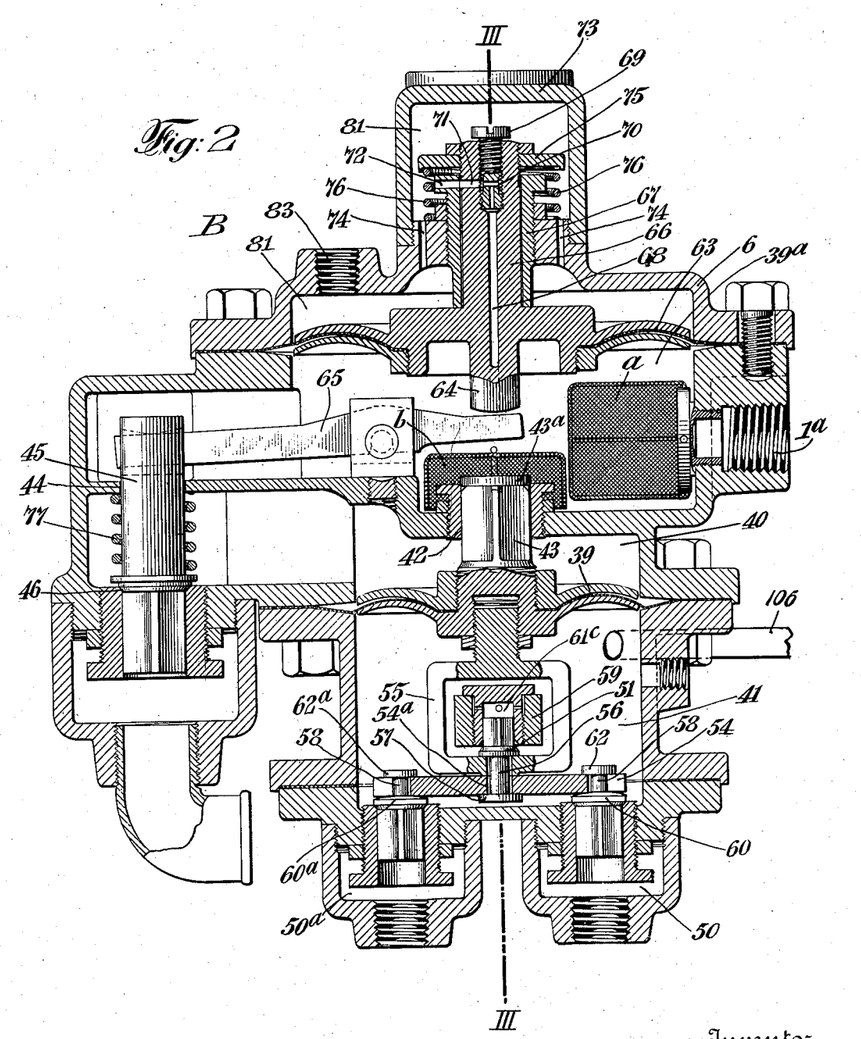
Fig. 2 an enlarged sectional view of that portion of the valve controlling the emergency application of the brakes.

The construction and operation of the parts contained in section B of the triple valve are as follows:

The train pipe chamber 2 is in direct communication with emergency train pipe chamber 39ª through a branch pipe 1ª. The chamber 39ª is in direct communication with a supplemental train pipe chamber 40, the lower wall of which chamber is formed by an emergency abutment 39. The upper wall of chamber 39ª is formed by a movable quick-action abutment or diaphragm 63. Between the chamber 39ª and the supplemental train pipe chamber 40 is a rigid wall 40ª formed with an opening 42 adapted to be closed by a valve 43; and an aperture 44, through which aperture a stem 45 of an exhaust valve 46 slides. The valve 43 is rigidly connected to the emergency abutment 39 so that it will reciprocate therewith, said valve 43 closing the aperture 42 when there is a superior pressure in chamber 40, and opening said aperture when the superior pressure is in chamber 41. The abutment 63 carries a central depending stem 64 which is adapted to engage one end of a lever 65, the other end of said lever engaging the stem 45 of the exhaust valve 46. The abutment 63 is also formed with a central upwardly extending stem 66 which fits loosely and slides in a sleeve 67 secured in the upper rigid wall of the casing B. There is a slight clearance between the stem 66 and the interior of the sleeve 67, so that there may be a leakage of air between the said parts when the abutment 63 is depressed, as will be more fully hereinafter described. The stems 64 and 66 are provided with an axial passage 68 extending therethrough. The upper end of this passage is closed by a screw 69, said screw being formed with a reduced portion 70 between its ends to form a slight chamber, as shown clearly in Fig. 2, and communicating with this chamber is a transverse port 71 formed in the stem 66. The screw 69 is provided with longitudinal and transverse apertures which place the axial passage 68 in communication with the port 71, the aperture in said screw being much smaller than the passage 68. In the sleeve 67 is formed a transverse aperture or port 72 which, when the abutment 63 is in its upper position, communicates with the aperture 71, thereby forming a more or less free communication between the chamber 39ª and a quick-action chamber 81 above the abutment 63. The port 72 opens into a chamber formed by a cap 73, said chamber constituting a part of the quick-action chamber 81 and being in direct and open communication therewith through openings 74. The chamber 81 is in communication with a supplemental reservoir 82 through pipe 83, said supplemental reservoir adding to the capacity of chamber 81 and preventing a too rapid equalizing of the pressures in the chambers 81 and 39ª. When the quick-action abutment 63 is depressed by a superior pressure in chamber 81 the ports 72 and 71 will be out of register and air can then pass from chamber 81 to chamber 39ª only around the stem 66 to the port 71, said port being then below the port 72 and within the sleeve 67.

Threaded on the upper end of the stem 66 is a disk 75, and between said disk and the upper wall of the chamber 81 is a spring 76, said spring tending to lift the abutment 63 and to maintain the ports 71 and 72 in register, and also opposing the pressure of the air in the quick-action chamber 81. A spring 77 surrounding stem 45 maintains the exhaust valve 46 seated until it is lifted through the lever 65. The valve 43 is formed with wings between its upper cylindrical end 43ª and its point of connection with the emergency abutment 39, so that when the circular portion of the valve is raised above the aperture 42 there will be free communication between the chambers 39ª and 40 through said aperture.

Connected to the emergency abutment 39 and depending therefrom into the emergency brake cylinder chamber 41 is a yoke 55. Extending into said chamber 41 is an arm 59, said arm being formed with an aperture 61 which opens to atmosphere through port 61ª and chamber 61ᵇ. The inner end of the port 61 opens into a chamber 61ᶜ which is adapted to be closed by a valve 51. The valve 51 is connected to the yoke 55 so that it will move up and down with said yoke in response to the movement of the emergency abutment 39. The valve 51 is formed with a depending stem 56 which passes through the lower arm of the yoke 55 and is formed with a head 57 on its lower end. Mounted on the stem 56 is a cross bar 54, said bar being formed with a transverse slot 54ª to receive said stem. The ends of the cross bar are slotted inwardly to receive the stems 58 of upwardly opening valves 60 and 60ª. The stems 58 are provided with heads 62 and 62ª at their upper ends, which heads engage the upper surface of the cross bar 54. The cross bar is confined between the head 57 and the lower end of the yoke 55, as clearly shown in the drawings. Valve 60 controls communication between the small chamber 50 and the emergency brake cylinder chamber 41, and with a pipe 41ᶜ which connects said chamber 50 with the emergency reservoir chamber 4. Valve 60ª controls communication between chamber 41 and the small chamber 50ª, this latter chamber being connected by pipe 41ᵈ with the equalizing chamber 25. The cross bar 54 is so held by the head 57 of the stem 56, and by the yoke 55, that there may be a slight vertical movement of that end thereof which is connected to the valve 60. After this slight upward movement, however, the cross bar becomes bound between the head 57 and the yoke, and thereafter further upward movement of the bar 54 and the yoke 55 will be caused by the upward movement of the abutment 39.

In the normal position of the parts, the chamber 41 is open to atmosphere through chamber 61ᶜ and port 61, the valve 51 being open. This is to permit the pressure in chamber 40 to positively hold valves 60 and 60ª closed at all times except upon an emergency application of the brakes. When, however, there is a superior pressure in chamber 41, emergency abutment 39 will be raised and valve 51 closed, thereby preventing escape of air through port 61.

The train pipe or augmenting reservoir F is connected to the train pipe and to the triple valve, through the change-over valve E, for all service applications of the brakes, precisely as shown and described in Patent No. 1,157,954. The said reservoir is connected to the emergency brake cylinder chamber 41 for emergency applications of the brakes, as will be fully described hereinafter.

The change-over valve consists of an outer main casing 84 forming a large train pipe chamber 85, said chamber being connected to the train pipe 1 through pipe 87. The upper wall of the chamber 85 is formed by a flexible diaphragm or movable abutment 88, which is clamped in position by the upper part 89 of the casing, said part forming an upper controlling chamber 90 above the diaphragm. The train pipe reservoir F is connected to the lower end of the retaining valve by means of a pipe 91, said pipe opening into a chamber 92 formed by a cap 93 screwed on the lower end of the main casing 84.

Extending upwardly through the bottom of the valve casing 84 and into the chamber 85, is an open-ended tubular post 94 having a valve 95 formed at its upper end. Sliding on this post is a sleeve 96, carried by the diaphragm 88 and adapted to be seated and unseated from the valve 95 by variations in pressure in chambers 85 and 90. Through the center of the diaphragm is a passage 97 which places the chamber 85 in free communication with chamber 90. Around the lower margin of the aperture 97 is formed a valve seat 98 which is adapted to receive and coöperate with the valve 95 of the tubular post 94. The sleeve 96 is enlarged at its upper end to form the small chamber 99, and said chamber is in communication with the train pipe chamber 85 through the aperture 100, so that when the valve seat 98 is raised above the valve 95 on the upper end of the tubular post 94, chamber 85 will be in free communication with the train pipe reservoir and with the chamber 90. Within the chamber 85 is arranged a coil spring 101, said spring bearing on the bottom wall of said chamber, and on the under side of the diaphragm 88, and tending to separate the valve seat 98 and valve 95 and to maintain the train pipe chamber 85 in communication with the train pipe reservoir.

In the upper wall of the chamber 90 is formed an aperture 102 which is adapted to be closed by an upwardly seating valve 103 carried by the diaphragm 88, said valve being positively moved to and from its seat through the movements of said diaphragm. The aperture 102 opens into a chamber 104 formed in a cap 105 to which pipe 106 is connected, said pipe leading from said chamber to the emergency brake cylinder chamber 41 of triple valve section B.

In chamber 104 and seating downwardly on a valve seat formed at the upper end of the aperture 10², is a valve 103ª. This valve is yieldingly held to its seat by means of a light spring which is held in place by means of any suitable form of yoke or spider arm secured within the chamber 104. This valve prevents the passage of air from the chamber 104 through aperture 102 to the chamber 90, but is so lightly held to its seat that air from chamber 90 may readily unseat it when the pressure in chamber 90 exceeds the pressure in chamber 104, plus the spring pressure on the valve 103ª.

Upon a slow reduction of train pipe pressure to secure a service application of the brakes, the parts in section A of the triple operate precisely the same way as described in my aforesaid application for patent. In charging the apparatus the charging operation takes place as set forth in my said application, the quick-action chamber and the supplemental reservoir being charged from chamber 39ª, as already described herein.

To secure an emergency application of the triple valve a sudden and pronounced reduction in train pressure is made, thereby reducing the pressure in chamber 39ª. This permits the superior pressure in quick-action chamber 81 to quickly depress quick-action diaphragm 63, thereby bringing the stem 64 into engagement with the lever 65 and opening the exhaust valve 46. Supplemental train pipe chamber 40 will be thereby exhausted to atmosphere through the large port controlled by the valve 46, and the pressure therein reduced to zero. As the valve 46 is opened, the valve 43 is in its closed position so that communication between chambers 39ª and 40 is only through the aperture 44 around the stem 45, so that the pressure in said chamber 40 is practically instantly reduced to zero. It is manifest, therefore, that the emergency abutment 39 is relieved of substantially all pressure upon the opening of valve 46.

Upon a sudden and prolonged reduction in train pipe pressure sufficient to secure the emergency application of the brakes, the pressure in chamber 85 of valve E will be sufficiently reduced to permit the air in chamber 90 to depress diaphragm 88 and bring seat 98 down to valve 95, thereby closing communication between the train pipe reservoir and the chamber 85. The reduction in pressure in chamber 85, in an emergency application of the brakes, will take place more rapidly than air can flow from chamber 90 into chamber 85, due to the restricted passage around valve 95, and to the further fact that the train pipe reservoir is in communication with chamber 90 through the large passage 97, so that the superior pressure in chamber 90 will depress diaphragm 88. As the said diaphragm is depressed valve 103 is drawn downwardly from its seat, thereby placing chamber 90 in communication with pipe 106 and with the emergency brake cylinder chamber 41 of the triple valve, the valve 103ª being readily unseated by the predominating pressure in chamber 90. This will permit air from the train pipe reservoir to flow through chamber 90 to the said emergency brake cylinder chamber 41 in sufficient volume and pressure to raise emergency abutment 39, thereby opening valves 60 and 60ª and closing valve 51 so that emergency reservoir air may pass through chamber 41, pipe 41ᵈ to chamber 25 and thence to the brake cylinder. Air will also pass from chamber 41 to chamber 21 through pipe 22, as described in my herein-mentioned application for patent. It is, therefore, manifest that the train pipe reservoir volume will be added to the emergency reservoir volume during all emergency applications of the brakes; and that the train pipe reservoir air, upon entering emergency brake cylinder chamber 41, will serve as the means for positively operating the means which control communication between the emergency reservoir chamber and the brake cylinder. It is also manifest that by means of the change-over valve shown in Figs. 6 and 7, the train pipe reservoir will be disconnected from the train pipe so that the air from said reservoir cannot flow into the train pipe upon an emergency application of the brakes. During all service applications of the brakes, however, the reduction of pressure in chamber 85 will be comparatively slow, thereby permitting an equalization of pressures in chambers 90 and 85 and preventing the seating of the valve 95 upon valve seat 98. The spring 101 maintains the diaphragm 88 in its upper position until there is a material preponderance of pressure in chamber 90. The excessive pressure in chamber 90 must be sufficient to overcome spring 101, and this preponderance of pressure will only occur when the pressure in chamber 85 is reduced suddenly and sufficiently to secure the emergency operation of the triple valve. The purpose of the valve 103ª is to prevent emergency reservoir air passing through valve E to train pipe reservoir F, should the pressure in the reservoir F be below the pressure in the chamber 41 after an equalization of pressures in the brake cylinders and emergency reservoir. It is manifest that superior pressure in chamber 104 will hold valve 103ª to its seat and there will be no communication between the train pipe reservoir F and the chamber 104. After repeated service applications of the brakes it is possible that the pressure in train pipe reservoir F will be reduced below the brake cylinder pressure, upon a subsequent emergency application, and as the pressure in chamber 41 upon an emergency application of the brakes will be equal to brake cylinder pressure, it is essential to provide the valve 103ª to prevent the superior pressure in chamber 41 flowing through valve E to the train pipe reservoir. Should the brake cylinder pressure leak down, after an emergency application of the brakes, to a point below the pressure in train pipe reservoir F, the valve 103ª will then be unseated by the superior pressure in chamber 90, and the train pipe reservoir volume will then be added to the brake cylinder volume.

It is manifest that upon a sudden reduction in train pipe pressure for the purpose of securing an emergency application of the brakes, emergency abutment 39 will be wholly relieved of pressure so that emergency reservoir pressure under valve 60, and brake cylinder pressure under valve 60ª, as the said brake cylinder pressure is built up, will tend to open these valves to admit emergency reservoir air into the emergency brake cylinder chamber 41, so that the said valves 60 and 60ª will be opened by air pressures from two separate sources of supply, one being the emergency reservoir and the other being the train pipe reservoir, each of these reservoirs constituting a supply of air which is completely independent of the train pipe air during emergency applications of the brakes.

It is also manifest that should the train pipe pressure be reduced to zero or approximately so, by a leakage or other reduction too slow to effect an emergency application in the usual way, the emergency reservoir pressure under valve 60 will force said valve open to admit emergency reservoir air to chamber 41, thereby effecting automatically an emergency application of the brakes. It is clear that when the emergency abutment 39 is relieved of all pressure or substantially all pressure, emergency reservoir air may force valve 60 from its seat because chamber 41 is vented to atmosphere and there is little or no pressure holding valve 60 to its seat. This feature is important, as it insures an application of the brakes should the train pipes slowly leak to zero or approximately so.

By means of the supplemental reservoir 82 sufficient volume of air is provided to prevent a rapid equalization between chambers 81 and 39ª after an emergency application of the brakes. This insures the quick-action abutment 63 holding the valve 46 open long enough to exhaust chamber 40 and permit the release of the emergency reservoir air through the operation of the valve 60, the diaphragm 39 and valve 60ª.

It is obvious that by providing screws 69 and 17ᶜ with properly proportioned apertures the rates of flow of air through the ports 17ª and 68 may be properly controlled. After the area of the orifice in each of these screws has been once determined and the screw has been placed in position, no further adjustment thereof is necessary.

It will, of course, be understood that properly constructed screens, as shown at $a$, $b$, and $c$ will be employed to screen the air as it flows into the apparatus.

Figures 6, 7:
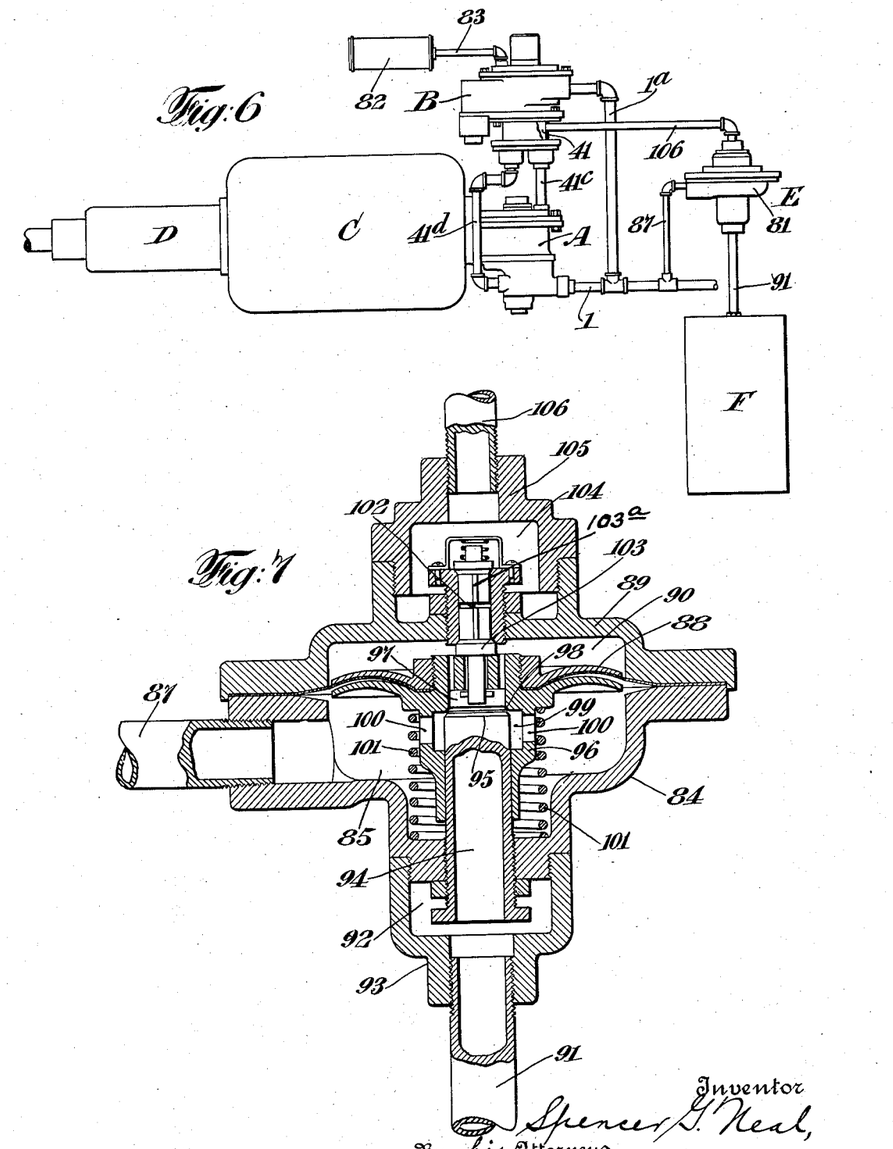
Fig. 6 a diagrammatic view of a braking unit embodying my invention.
Fig. 7 a detail sectional view of the change-over valve.

The change-over valve illustrated in Figs. 6 and 7 will be made the subject-matter of another application.

What I claim is:

1. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes by train pipe pressure alone, means operated by air from a separate source of supply upon a sudden reduction of train pipe pressure to place the emergency reservoir chamber in communication with the emergency brake cylinder chamber, and means adapted to be operated by air in the emergency brake cylinder chamber to place said chamber in communication with the brake cylinder.

2. A triple valve provided with a main train pipe chamber, an equalizing chamber adapted to be placed in direct communication with a brake cylinder, means operated by a decrease in train pipe pressure to place the train pipe chamber in communication with the equalizing chamber for a service application of the brakes by train pipe pressure alone, and means operated by air pressure from a separate source of supply upon a sudden reduction of train pipe pressure to admit air to the brake cylinder for an emergency application of the brakes.

3. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes by train pipe pressure alone, a pair of valves controlling communication between the emergency reservoir chamber and the emergency brake cylinder chamber and from said latter chamber to the equalizing chamber, means for holding said valves closed by train pipe pressure, and means operating upon a sudden reduction of train pipe pressure to release the air pressure from said valve holding means.

4. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes by train pipe pressure alone, a pair of valves controlling communication between the emergency reservoir chamber and the emergency brake cylinder chamber and from said latter chamber to the equalizing chamber, means for holding the said valves closed by train pipe pressure, means to release the air pressure from said valve holding means to thereby permit air pressure from a separate source of supply to open the said pair of valves for an emergency application of the brakes.

5. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes by train pipe pressure alone, a pair of valves controlling communication between the emergency reservoir chamber and the emergency brake cylinder chamber and from said latter chamber to the equalizing chamber, means for holding said valves closed by train pipe pressure, means operating upon a sudden reduction of train pipe pressure to release the air pressure to the atmosphere from said valve holding means and to thereby permit air from a separate source of supply to open the said pair of valves for an emergency application of the brakes.

6. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes by train pipe pressure alone, a valve device controlling communication between the emergency reservoir chamber and the emergency brake cylinder chamber and from said latter chamber to the equalizing chamber, means for holding the said valve device in its closed position by train pipe pressure, means operating upon sudden reduction of train pipe pressure to release the air pressure to the atmosphere from said valve holding means to thereby permit air from a separate source of supply to open the said valve device for an emergency application of the brakes.

7. A triple valve comprising means operating upon a slow reduction of train pipe pressure to admit train pipe air to the brake cylinder for a service application of the brakes by train pipe pressure alone, an emergency reservoir chamber, means operated by air from a source of supply which is separated from the train pipe upon a sudden reduction of train pipe pressure to place the emergency reservoir chamber in communication with the brake cylinder for an emergency application of the brakes.

8. A triple valve comprising means operating upon a slow reduction of train pipe pressure to admit train pipe air to the brake cylinder for a service application of the brakes by train pipe pressure alone, an emergency reservoir chamber, an emergency brake cylinder chamber, an emergency abutment in said chamber, a valve device connected to said abutment and controlling communication between the emergency reservoir chamber and the brake cylinder, an emergency train pipe chamber, means operated by a sudden reduction of pressure in the emergency train pipe chamber to relieve the emergency abutment of pressure.

9. A triple valve comprising means operating upon a slow reduction of train pipe pressure to admit train pipe air to the brake cylinder for a service application of the brakes by train pipe pressure alone, an emergency reservoir chamber, an emergency brake cylinder chamber, an emergency abutment forming one wall of said chamber, a valve device connected to said abutment and controlling communication between the emergency reservoir chamber the emergency brake cylinder chamber and the brake cylinder, an emergency train pipe chamber above the emergency abutment, a quick-action abutment in said emergency train pipe chamber, a quick-action chamber above the quick-action abutment, means to permit air to flow freely from the emergency train pipe chamber into the quick-action chamber, said means serving to restrict the flow of air back to the emergency train pipe chamber upon a sudden reduction of train pipe pressure, and means operated by said quick-action abutment upon said sudden reduction of train pipe pressure to vent the emergency train pipe chamber to atmosphere for an emergency application of the brakes.

10. A triple valve comprising means operating upon a slow reduction of train pipe pressure to admit train pipe air to the brake cylinder for a service application of the brakes by train pipe pressure alone, an emergency reservoir chamber, an emergency brake cylinder chamber, an emergency abutment forming the upper wall thereof, a pair of valves connected to said abutment and controlling communication between the emergency brake cylinder chamber, emergency reservoir chamber and the brake cylinder, an emergency train pipe chamber, a supplemental train pipe chamber above the emergency abutment and in communication with the emergency train pipe chamber, a valve carried by the emergency abutment and controlling the said communication, a quick-action abutment above the emergency train pipe chamber, a quick-action chamber above said quick-action abutment, means to permit air to flow from the emergency train pipe chamber into the quick-action chamber upon an increase of train pipe pressure to charge the quick-action chamber, means operating upon the sudden reduction in train pipe pressure to exhaust air from the supplemental train pipe chamber to atmosphere for an emergency application of the brakes.

11. An air brake apparatus comprising a train pipe, a brake cylinder, a triple valve, a train pipe reservoir normally in communication with the train pipe, means adapted to be operated by train pipe reservoir pressure upon a sudden reduction of train pipe pressure to seal the train pipe reservoir from the train pipe and place said reservoir in communication with the brake cylinder through the triple valve for an emergency application of the brakes.

12. An air brake apparatus comprising a train pipe, a brake cylinder, a triple valve, a train pipe reservoir normally in communication with the train pipe for all service applications of the brakes, and means operating upon a sudden reduction in train pipe pressure sufficient to secure an emergency application of the brakes to place said service reservoir in communication with the brake cylinder through the triple valve.

13. An air brake apparatus comprising a train pipe, a brake cylinder, a triple valve, a train pipe reservoir, a change-over valve normally connecting the train pipe reservoir to the train pipe for service applications of the brakes and operated upon a sudden reduction of train pipe pressure to seal the said reservoir from the train pipe and place it in communication with the brake cylinder through the triple valve for emergency applications of the brakes.

14. An air brake apparatus comprising a train pipe, a brake cylinder, a train pipe reservoir, a change-over valve normally connecting the train pipe reservoir to the train pipe for service applications of the brakes, a triple valve formed with an emergency brake cylinder chamber and an emergency reservoir chamber, means adapted to connect the emergency brake cylinder chamber to the brake cylinder, means in the change-over valve operated upon a sudden reduction of train pipe pressure to seal the train pipe reservoir from the train pipe and to place it in communication with the emergency brake cylinder chamber, and means in said chamber operated by air from the train pipe reservoir to open communication between the emergency reservoir chamber and the brake cylinder.

15. An air brake apparatus comprising a train pipe, a brake cylinder, a train pipe reservoir, an emergency reservoir, a triple valve formed with a train pipe chamber, an equalizing chamber in direct communication with the brake cylinder, an emergency reservoir chamber in direct communication with the emergency reservoir, an emergency brake cylinder chamber, means in the triple valve operated by a decrease in train pipe pressure to place the train pipe chamber in communication with the equalizing chamber for a service application of the brakes by train pipe pressure alone, and means in the emergency brake cylinder chamber adapted to be operated by air pressure from the train pipe reservoir upon a sudden reduction of train pipe pressure to place the emergency reservoir in communication with the brake cylinder for an emergency application of the brakes.

16. An air brake apparatus comprising a train pipe, a brake cylinder, an emergency reservoir, a train pipe reservoir, a triple valve, a change-over valve normally connecting the train pipe reservoir to the train pipe for service applications of the brakes, means in the change-over valve to connect the train-pipe reservoir to the triple valve upon a sudden reduction in train pipe pressure, and means in the triple valve adapted to be operated by air from the train pipe reservoir to place the emergency reservoir in communication with the brake cylinder.

17. An air brake apparatus comprising a train pipe, a brake cylinder, an emergency reservoir, a train pipe reservoir, a triple valve, a change-over valve normally connecting the train pipe reservoir to the train pipe for service applications of the brakes, means in the change-over valve to connect the train pipe reservoir to the triple valve upon a sudden reduction in train pipe pressure, and means in the triple valve adapted to be operated by air from the train pipe reservoir to place the emergency reservoir in communication with the brake cylinder, said means also connecting the train pipe reservoir to the brake cylinder for an emergency application of the brakes.

18. An air brake apparatus comprising a train pipe, a brake cylinder, an emergency reservoir, a triple valve comprising a service section and an independent emergency section, means in the service section to control train pipe air for all service applications of the brakes and the release of the brakes, means in the emergency section to control emergency reservoir air for emergency applications of the brakes, a train pipe reservoir connected to the train pipe for service applications of the brakes, and means operating upon a sudden reduction of train pipe pressure to connect the train pipe reservoir to the emergency section of the triple valve for emergency applications of the brakes.

19. An air brake apparatus comprising a train pipe, a brake cylinder, an emergency reservoir, a triple valve comprising a service section and an independent emergency section, means in the service section to control train pipe air for all service applications of the brakes and the release of the brakes, a train pipe reservoir connected to the train pipe for service applications of the brakes, means operating upon a sudden reduction of train pipe pressure to connect the train pipe reservoir with the emergency section of the triple valve, and means in the emergency section of the triple valve adapted to be operated by air from the train pipe reservoir to place the emergency reservoir in communication with the brake cylinder for emergency applications of the brakes.

20. A triple valve comprising a service section, means in said section to control train pipe air for service applications of the brakes and the release of the brakes, an independent emergency section, an emergency brake cylinder chamber in said section, an emergency train pipe chamber, a supplemental train pipe chamber, an emergency abutment between the emergency brake cylinder chamber and the supplemental train pipe chamber, a quick-action abutment forming the upper wall of the emergency train pipe chamber, a quick-action chamber above said quick-action abutment, a valve controlling an exhaust port from the supplemental train pipe chamber, means operated by the quick-action abutment to open said exhaust valve upon a sudden reduction in train pipe pressure, means operated by the emergency abutment to open communication between the supplemental train pipe chamber and the emergency train pipe chamber, and means operated by said emergency abutment to place the emergency reservoir in communication with the brake cylinder for an emergency application of the brakes.

21. A triple valve comprising a service section, means in said section to control train pipe air for service applications of the brakes and the release of the brakes, an independent emergency section, a supplemental train pipe chamber in said section, an emergency train pipe chamber in said section, means operating upon a sudden reduction in train pipe pressure to vent the supplemental train pipe chamber to atmosphere, and means operating to vent the emergency train pipe chamber to atmosphere after the supplemental train pipe chamber has been vented.

22. A triple valve comprising an emergency section, a supplemental train pipe chamber therein, an emergency train pipe chamber, an emergency abutment, means operating upon a sudden reduction in train pipe pressure to vent the supplemental train pipe chamber to atmosphere, means operated by the emergency abutment to open communication between the supplemental train pipe chamber and the emergency train pipe chamber after said supplemental chamber has been vented to atmosphere, and means adapted to be operated by said emergency abutment to place the emergency reservoir in communication with the brake cylinder for an emergency application of the brakes.

23. An air brake apparatus comprising a train pipe, an emergency reservoir, a brake cylinder, a triple valve, means in the triple valve controlling train pipe air for service applications of the brakes, a supplemental train pipe chamber, an emergency train pipe chamber, an emergency abutment, a train pipe reservoir connected to the train pipe for service applications of the brakes, means in the triple valve operating upon a sudden reduction in train pipe pressure to vent the supplemental train pipe chamber to atmosphere, means operating upon a sudden reduction in train pipe pressure to place the train pipe reservoir in communication with the triple valve to move the emergency abutment therein, means operated by said emergency abutment to open communication between the supplemental train pipe chamber and the emergency train pipe chamber and to open communication between the emergency reservoir and the brake cylinder.

24. A triple valve comprising a service section, means therein to control service applications of the brakes and the release of the brakes, an emergency section, an emergency train pipe chamber therein, a quick-action abutment forming one wall of said emergency train pipe chamber, a quick-action chamber above the quick-action abutment, means permitting free communication between the emergency train pipe chamber and the quick-action chamber during a slow reduction in train pipe pressure, means to restrict said communication upon a sudden reduction in train pipe pressure, and means operating upon a sudden reduction in train pipe pressure to vent the emergency train pipe chamber to atmosphere.

25. An air brake apparatus comprising a train pipe, a brake cylinder, a train pipe reservoir, a change-over valve normally connecting the train pipe reservoir to the train pipe for service applications of the brakes, a triple valve formed with an emergency brake cylinder chamber and an emergency reservoir chamber, means adapted to connect the emergency brake cylinder chamber to the brake cylinder, means in the change-over valve operated upon a sudden reduction of train pipe pressure to seal the train pipe reservoir from the train pipe and to place it in communication with the emergency brake cylinder chamber, means in said chamber operated by air from the train pipe reservoir to open communication between the emergency reservoir chamber and the brake cylinder, and means to prevent air passing from the emergency brake cylinder chamber to the train pipe reservoir.

26. An air brake apparatus comprising a train pipe, a brake cylinder, a train pipe reservoir, a change-over valve normally connecting the train pipe reservoir to the train pipe for service applications of the brakes, a triple valve formed with an emergency brake cylinder chamber and an emergency reservoir chamber, means adapted to connect the emergency brake cylinder chamber to the brake cylinder, means in the change-over valve operated upon a sudden reduction of train pipe pressure to seal the train pipe reservoir from the train pipe and to place it in communication with the emergency brake cylinder chamber, means in said chamber operated by air from the train pipe reservoir to open communication between the emergency reservoir chamber and the brake cylinder, and means to prevent air passing from the emergency brake cylinder chamber to the train pipe reservoir, said means permitting air to pass from the train pipe reservoir to the brake cylinder when the superior pressure is in the reservoir, and closing to prevent air passing from the brake cylinder to the train pipe reservoir when the superior pressure is in the brake cylinder.

27. A triple valve comprising means operating upon a slow reduction of train pipe pressure to admit train pipe air to the brake cylinder for a service application of the brakes by train pipe pressure alone, an emergency reservoir chamber, a valve device controlling communication between said emergency reservoir chamber and a brake cylinder, means operated by train pipe pressure for holding said valve in its closed position, the emergency reservoir air operating on said valve in opposition to the train pipe pressure, whereby upon a slow reduction of train pipe pressure to zero or approximately so, the emergency reservoir pressure will open said valve and permit air to flow from the emergengy reservoir to the brake cylinder for an emergency application of the brakes.

28. A triple valve, comprising means operating upon a slow reduction of train pipe pressure to admit train pipe air to the brake cylinder for a service application of the brakes by train pipe pressure alone, an emergency reservoir chamber, a valve device controlling communication between the emergency reservoir chamber and a brake cylinder, a diaphragm connected to said valve and subject to train pipe pressure for holding said valve in closed position against the pressure of air in the emergency train pipe chamber, whereby upon a slow reduction of train pipe pressure to zero or approximately so, the emergency reservoir pressure will open said valve device and flow to the brake cylinder for an emergency application of the brakes.

29. A triple valve comprising means operating upon a slow reduction of train pipe pressure to admit air to the brake cylinder for a service application of the brakes, an emergency reservoir chamber, a valve device controlling communication between said emergency reservoir chamber and a brake cylinder, means operated by train pipe pressure for holding said valve device in its closed position against the pressure of air in the emergency reservoir chamber, whereby upon a slow reduction of train pipe pressure to zero or approximately so, emergency reservoir air will open said valve device to permit emergency reservoir air to flow to the brake cylinder.

30. A triple valve comprising means operating upon a slow reduction of train pipe pressure to admit air to the brake cylinder for a service application of the brakes, an emergency reservoir chamber, a valve device controlling communication between said emergency reservoir chamber and a brake cylinder, a diaphragm connected to said valve device and of larger area than said valve device and subject to train pipe pressure to hold said valve device in its closed position against the pressure of air in the emergency reservoir chamber, whereby upon a slow reduction of train pipe pressure to zero or approximately so, emergency reservoir air will open said valve device to permit emergency reservoir air to flow to the brake cylinder.

31. A triple valve comprising means operating upon a slow reduction of train pipe pressure to admit train pipe air to the brake cylinder for a service application of the brakes by train pipe pressure alone, an emergency reservoir chamber, a valve device controlling communication between said chamber and a brake cylinder and held in its closed position against emergency reservoir pressure by train pipe pressure, whereby upon a slow reduction of train pipe pressure to zero or approximately so, the emergency reservoir air will open said valve and flow to the brake cylinder.

32. In an air brake apparatus, a valve device comprising a quick-action abutment and an emergency abutment, said abutments forming an emergency brake cylinder chamber, an emergency train pipe chamber and a quick-action chamber, the quick-action abutment being provided with means for slowly equalizing the pressures in the emergency train pipe chamber and in the quick-action chamber, means operated by the quick-action abutment to vent the emergency train pipe chamber to atmosphere upon a sudden reduction in train pipe pressure, and means operated upon a sudden reduction of train pipe pressure to admit air to the emergency brake cylinder chamber to move the emergency abutment and thereby open communication between an emergency reservoir and a brake cylinder, and means for moving the quick-action abutment to close the vent from the emergency train pipe chamber upon an equalization of pressures in the quick-action chamber and in the emergency train pipe chamber.

33. In an air brake apparatus, a valve device comprising a quick-action abutment forming a quick-action chamber and an emergency train pipe chamber, means operated by the quick-action abutment upon a sudden reduction in train pipe pressure to vent the emergency train pipe chamber to atmosphere to secure an emergency application of the brakes, means for permitting the air from the quick-action chamber to slowly leak into the emergency train pipe chamber, and means to move the quick-action abutment to close the vent from the emergency train pipe chamber upon a slow leak-down of pressure in the quick-action chamber.

34. A triple valve comprising a service section, means in said section to control train pipe air for service applications of the brakes and the release of the brakes, an independent emergency section, an emergency train pipe chamber in said emergency section, means operating upon a sudden reduction in train pipe pressure to vent the train pipe to atmosphere through said emergency section, and means in said emergency section to close said train pipe vent a predetermined time after the sudden reduction in train pipe pressure.

35. A triple valve comprising a service section, means in said section to control train pipe air for service applications of the brakes and the release of the brakes, an independent emergency section, a quick-action abutment in said emergency section, a quick-action chamber formed on one side of said quick-action abutment, a train pipe chamber being formed on the other side of said abutment, means to slowly charge the quick-action chamber from the train pipe chamber, means operated by the quick-action abutment upon a sudden reduction of train pipe pressure to vent the train pipe to atmosphere through said emergency section, and means to close said train pipe vent upon an equalization of pressures on opposite sides of the quick-action abutment.

36. A triple valve comprising a service section, means in said section to control train pipe air for service applications of the brakes and the release of the brakes, an independent emergency section, a quick-action abutment in said emergency section subject to train pipe air on one side, a quick-action chamber being formed on the opposite side of said abutment, means for slowly equalizing the pressures on opposite sides of said quick-action abutment, means operated by the quick-action abutment upon a sudden reduction in train pipe pressure to vent the train pipe air to atmosphere through the emergency section, and means to close said vent upon the slow leak-down of pressure in the quick-action chamber.

37. A triple valve for air brake apparatus, comprising means operating upon a slow reduction of train pipe pressure to admit train pipe air to the brake cylinder for service applications of the brakes, and means operating upon a sudden reduction in train pipe pressure to admit emergency reservoir air to the brake cylinder for an emergency application of the brakes, said means venting the train pipe to atmosphere through the triple valve, and means for closing said train pipe vent at a predetermined time after the sudden reduction in train pipe pressure.

38. An air brake apparatus comprising a train pipe, a brake cylinder, an emergency reservoir, a train pipe reservoir and a triple valve formed of two independent casings, means in one of said casings to control train pipe air for all service applications of the brakes and for the release of the brakes, means in the other casing to control emergency reservoir air for emergency applications of the brakes only, said means being operated by service reservoir air upon a sudden reduction in train pipe pressure, the said service reservoir being at that time cut off from the train pipe and placed in direct communication with the triple valve.

39. A triple valve for that type of air brake apparatus in which train pipe air is admitted to the brake cylinder for service applications of the brakes upon a slow reduction of train pipe pressure and wherein emergency reservoir air is admitted to the brake cylinder upon a sudden reduction in train pipe pressure for emergency applications of the brakes and wherein a train pipe reservoir is employed to augment the train pipe volume, and consisting of two independent casings, means in one of said casings to admit train pipe air to the brake cylinder for service applications of the brakes upon a slow reduction in train pipe pressure and to exhaust air from the brake cylinder upon an increase in train pipe pressure, and means in the other casing to control emergency reservoir air for emergency applications of the brakes only and operated by train pipe reservoir air upon a sudden reduction in train pipe pressure.

40. An air brake apparatus comprising a train pipe, a brake cylinder, an emergency reservoir, a triple valve, means in said valve to control train pipe air for all service applications of the brakes by train pipe pressure alone, a train pipe reservoir in open communication with the train pipe during all slow reductions in train pipe pressure for service applications of the brakes, means operating upon a sudden reduction of train pipe pressure to connect the train pipe reservoir with the triple valve, and means in the triple valve adapted to be operated by air from the train pipe reservoir to place the emergency reservoir in communication with the brake cylinder for an emergency application of the brakes.

41. A triple valve for that type of air brake apparatus in which train pipe air is admitted to the brake cylinder for service applications of the brakes upon a slow reduction of train pipe pressure and wherein emergency reservoir air is admitted to the brake cylinder upon a sudden reduction in train pipe pressure for emergency applications of the brakes, and wherein a train pipe reservoir is employed to augment the train pipe volume for service applications of the brakes and consisting of means operating upon a slow reduction of train pipe pressure to admit train pipe air to the brake cylinder for a service application of the brakes, and means operating upon a sudden reduction in train pipe pressure to seal the train pipe reservoir from the train pipe and to place it in communication with means for effecting the emergency application of the brakes, whereby in emergency applications of the brakes the train pipe volume will be reduced.

42. A triple valve for that type of air brake apparatus in which train pipe air is admitted to the brake cylinder for service applications of the brakes upon a slow reduction of train pipe pressure and wherein emergency reservoir air is admitted to the brake cylinder upon a sudden reduction in train pipe pressure for emergency applications of the brakes, and wherein a train pipe reservoir is employed to augment the train pipe volume for service applications of the brakes and consisting of means operating upon a slow reduction of train pipe pressure to admit train pipe air to the brake cylinder for a service application of the brakes, means operating upon a sudden reduction in train pipe pressure to vent the train pipe to atmosphere and place the emergency reservoir in communication with the brake cylinder for an emergency application of the brakes, and means operating upon a sudden reduction in train pipe pressure to seal the train pipe reservoir from the train pipe whereby upon an emergency application of the brakes the train pipe volume will be reduced.

43. A triple valve for that type of air brake apparatus in which train pipe air is admitted to the brake cylinder for service applications of the brakes upon a slow reduction of train pipe pressure and wherein emergency reservoir air is admitted to the brake cylinder upon a sudden reduction in train pipe pressure for emergency applications of the brakes, and wherein a train pipe reservoir is employed to augment the train pipe volume for service applications of the brakes and consisting of means operating upon a slow reduction of train pipe pressure to admit train pipe air to the brake cylinder for a service application of the brakes, and means operating upon a sudden reduction in train pipe pressure to place the emergency reservoir in communication with the brake cylinder for an emergency application of the brakes and to seal the train pipe reservoir from the train pipe, whereby the train pipe volume will be reduced for emergency applications of the brakes.

44. An air brake apparatus comprising a brake pipe, a brake pipe reservoir to augment the brake pipe volume, an emergency reservoir, a brake cylinder, means operating upon a slow reduction of brake pipe pressure to place the brake pipe in communication with the brake cylinder for a service application of the brakes, means operating upon a sudden reduction of brake pipe pressure to vent the brake pipe to atmosphere and to place the emergency reservoir in communication with the brake cylinder for an emergency application of the brakes, and means to seal the brake pipe reservoir from the brake pipe, whereby the brake pipe volume will be reduced at the triple valve and the reduced brake pipe volume vented to atmosphere.

45. In an air brake apparatus of that type in which the triple valve is operated by slow reductions of train pipe pressure to admit train pipe air to the brake cylinder for service applications of the brakes and in which a train pipe reservoir is connected to the train pipe to augment the train pipe volume for service braking purposes, and wherein the triple valve is provided with means operating upon a sudden reduction of train pipe pressure to connect an emergency reservoir to the brake cylinder for emergency applications of the brakes, means operating upon a sudden reduction of train pipe pressure for an emergency application of the brakes to seal the train pipe reservoir from the train pipe and connect it to the triple valve, said means being operated by train pipe reservoir pressure when the train pipe pressure is suddenly reduced, whereby the train pipe volume will be reduced and the train pipe reservoir will be connected to the triple valve during emergency applications of the brakes.

46. In an air brake apparatus of the class defined in claim 45, and including means to augment the train pipe volume for all service applications of the brakes, and means operating upon a sudden reduction of train pipe pressure to cut off a portion of the train pipe volume from the train pipe and place said cut-off volume in communication with the triple valve in emergency applications of the brakes.

In testimony whereof I hereunto affix my signature.

SPENCER G. NEAL.